Figure 1:
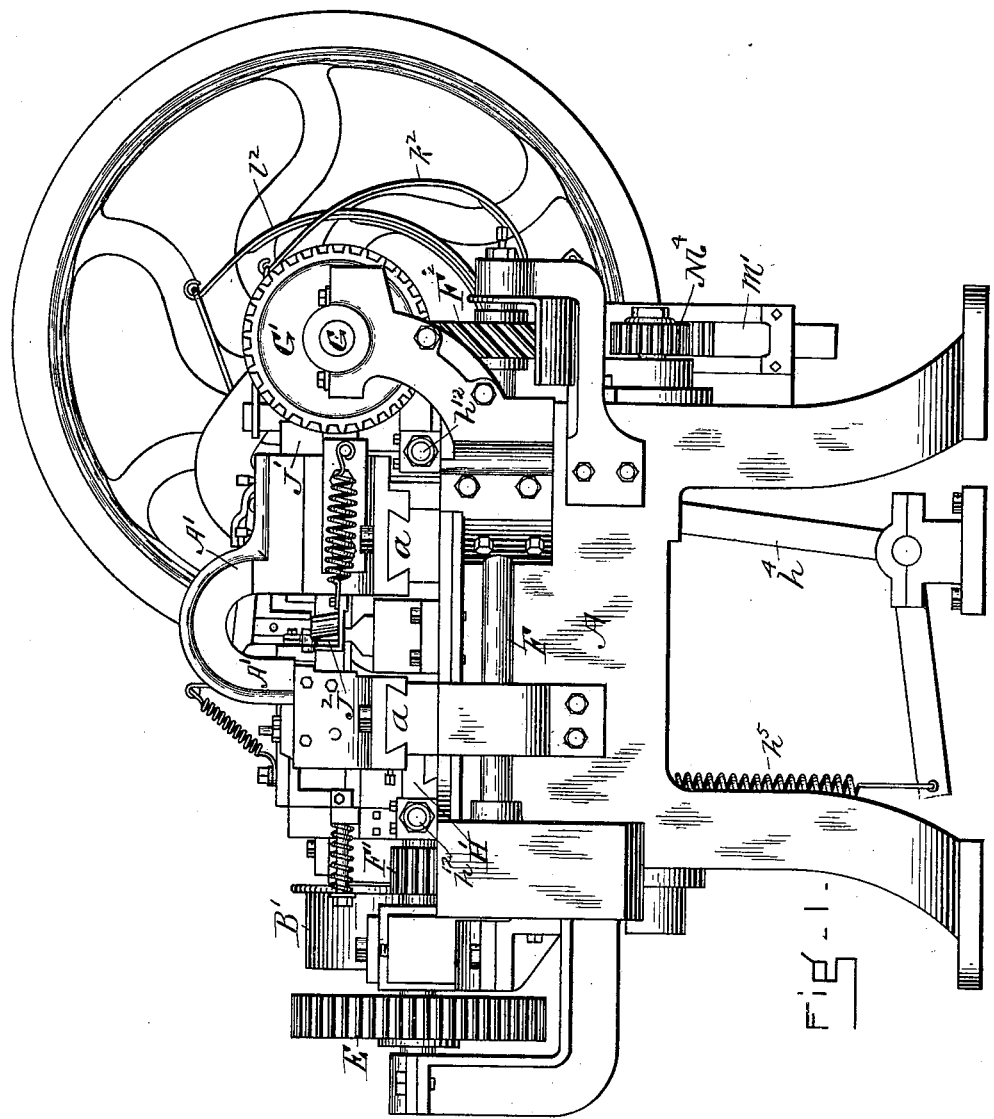

No. 631,482. Patented Aug. 22, 1899.
J. H. WILSON.
MACHINE FOR MAKING TOE CALKS.
(Application filed Aug. 26, 1898.)

(No Model.) 7 Sheets—Sheet 2.

WITNESSES
Frank G. Parker.
Leo A. Walsh.

INVENTOR
John H. Wilson

No. 631,482. Patented Aug. 22, 1899.
J. H. WILSON.
MACHINE FOR MAKING TOE CALKS.
(Application filed Aug. 26, 1898.)

(No Model.) 7 Sheets—Sheet 3.

WITNESSES
Frank G. Parker
Leo A. Walsh

INVENTOR
John H. Wilson

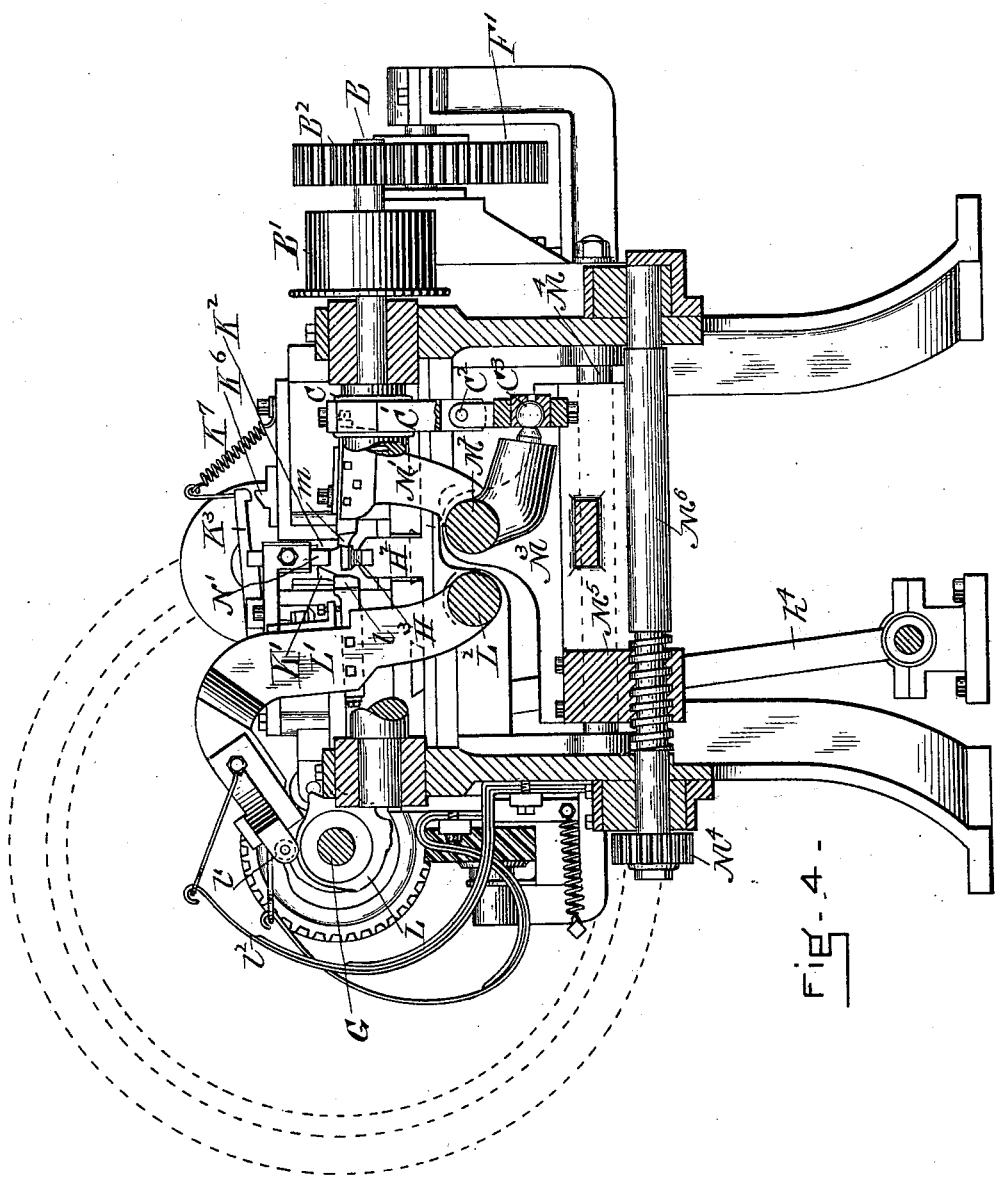

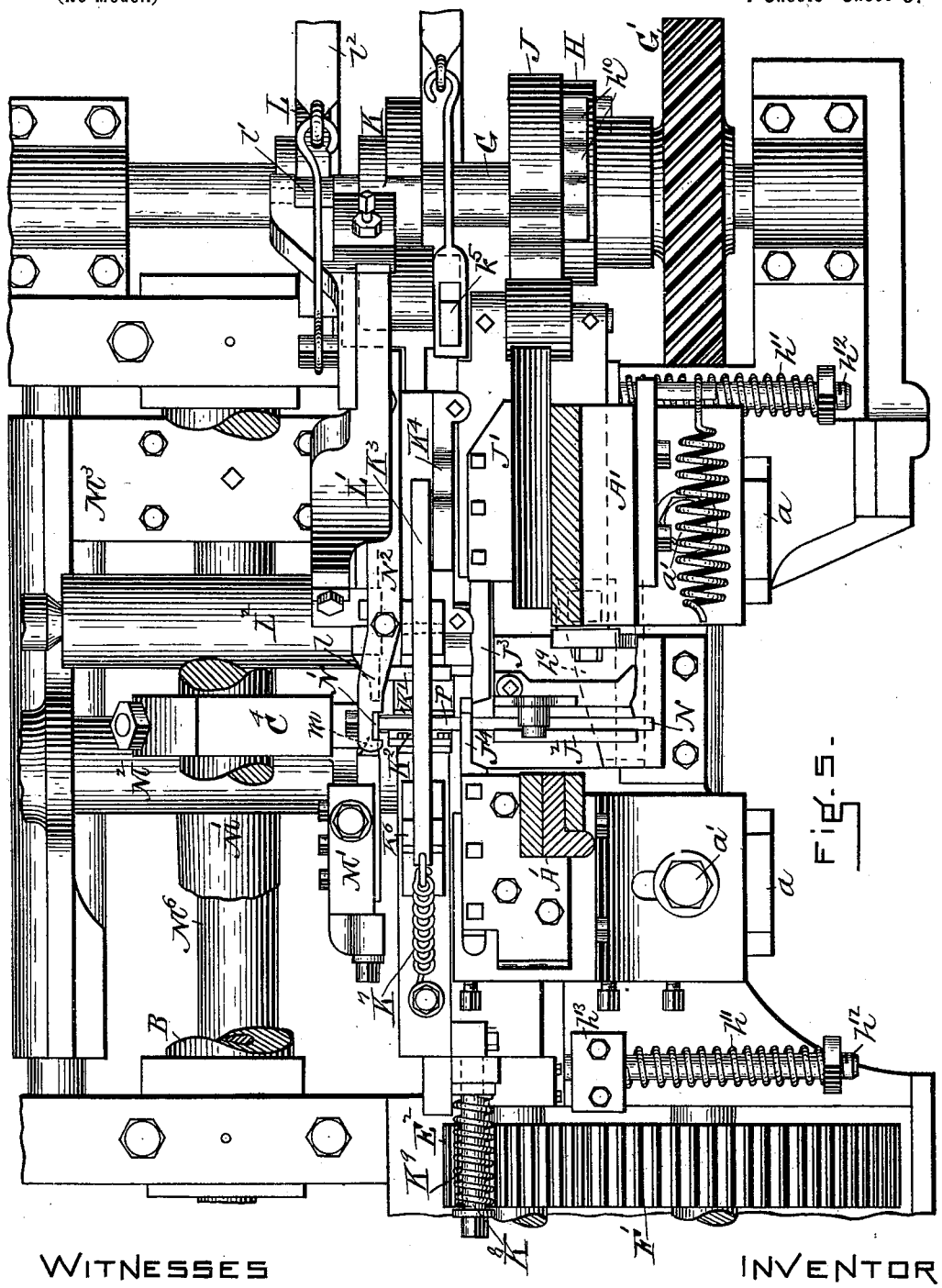

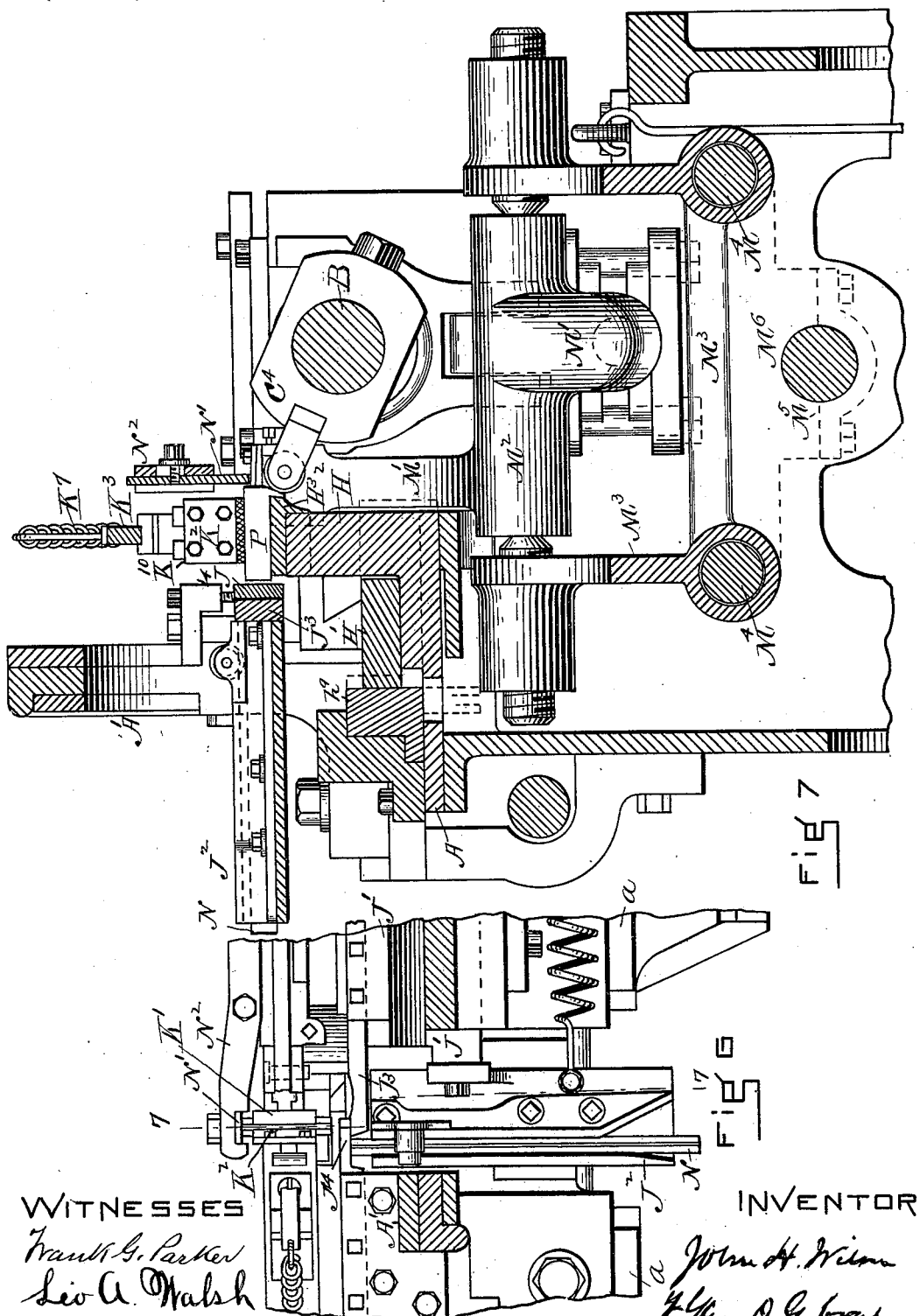

No. 631,482. Patented Aug. 22, 1899.
J. H. WILSON.
MACHINE FOR MAKING TOE CALKS.
(Application filed Aug. 26, 1898.)
(No Model.) 7 Sheets—Sheet 7.
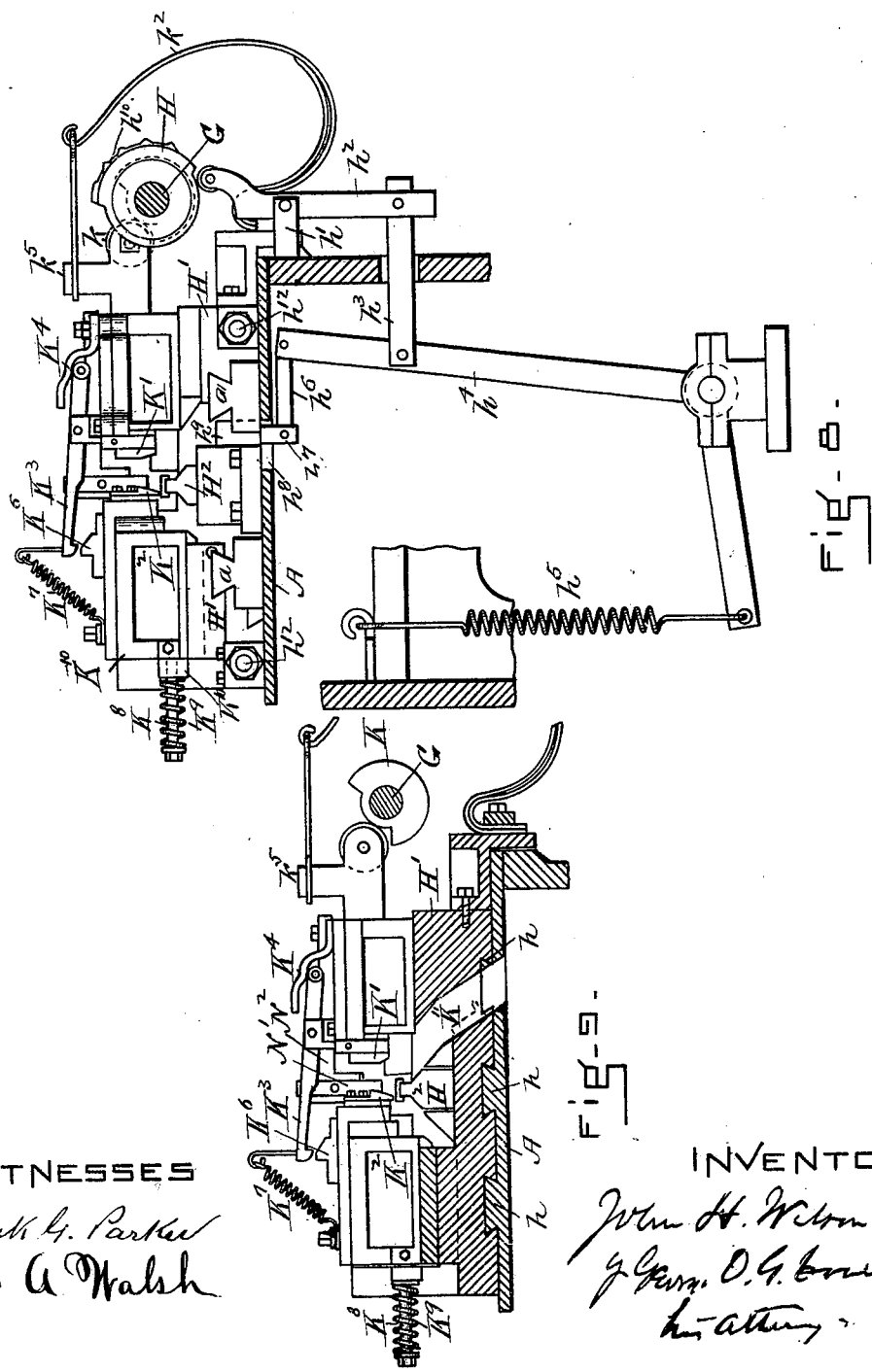
WITNESSES
Frank G. Parker
Leo A. Walsh
INVENTOR
John H. Wilson

UNITED STATES PATENT OFFICE.

JOHN H. WILSON, OF BOSTON, MASSACHUSETTS, ASSIGNOR TO THE NEW ENGLAND TOE CALK COMPANY, OF BATH, MAINE.

MACHINE FOR MAKING TOE-CALKS.

SPECIFICATION forming part of Letters Patent No. 631,482, dated August 22, 1899.

Application filed August 26, 1898. Serial No. 689,570. (No model.)

*To all whom it may concern:*

Be it known that I, JOHN H. WILSON, of Boston, in the county of Suffolk and State of Massachusetts, have invented a new and useful Improvement in Machines for Making Toe-Calks, of which the following is a specification.

My invention relates to a machine for cutting off a blank and making a toe-calk therefrom. It is an improvement upon other machines now well known both in its comparative simplicity and in the value of its product.

While the general process of making toe-calks herein to be described is similar to other processes, it differs therefrom mainly in that the blank of which the toe-calk is made is cut off before the process of making the toe-calk begins (this change in the process being desirable because the toe-calk has to be treated while at a very high temperature) and also in that the spur of the toe-calk is made narrower by each successive blow of the side-forming mechanism. My improvements, however, relate to the mechanical construction of the machine, more especially to the timing of the cutters, whereby they shall cut off the blank before the toe-calk is formed, as above described, to mechanism whereby the toe-calk blank is given a forward-and-back movement upon the stationary anvil, so that the point of the toe-calk may be hammered laterally in such a manner as to prevent the making of the fin, and to the hammers, one of which is mounted on a sliding frame which advances slightly with each stroke of the hammer and is withdrawn when the calk is completed; and also to a sluice or guide way in which the bar is laid and which moves laterally after the blank has been cut off and carries the bar with it, remaining in its new position until the toe-calk is finished and it is time for a new blank to be cut off. There are also various details of construction in this machine which render it different, mechanically speaking, from any other machine of which I have knowledge and which will be referred to below in connection with the drawings.

My improvements are shown in the drawings in the true form now known to me.

Figure 2:
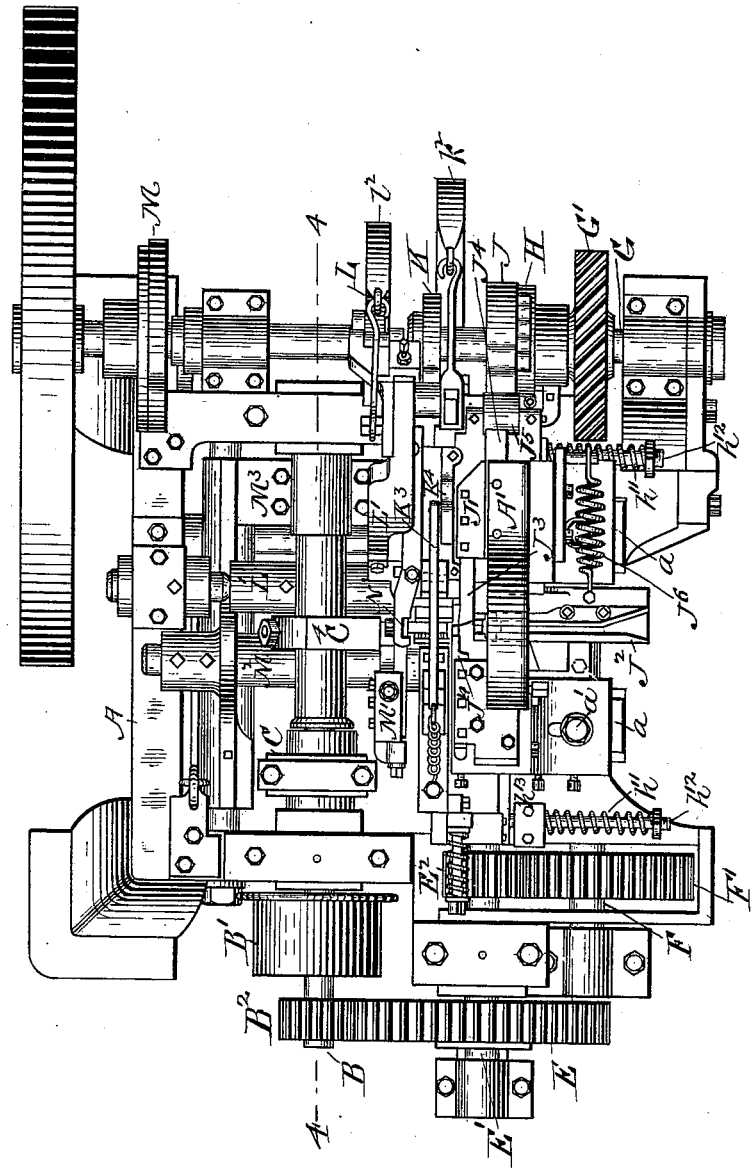
Figure 3:
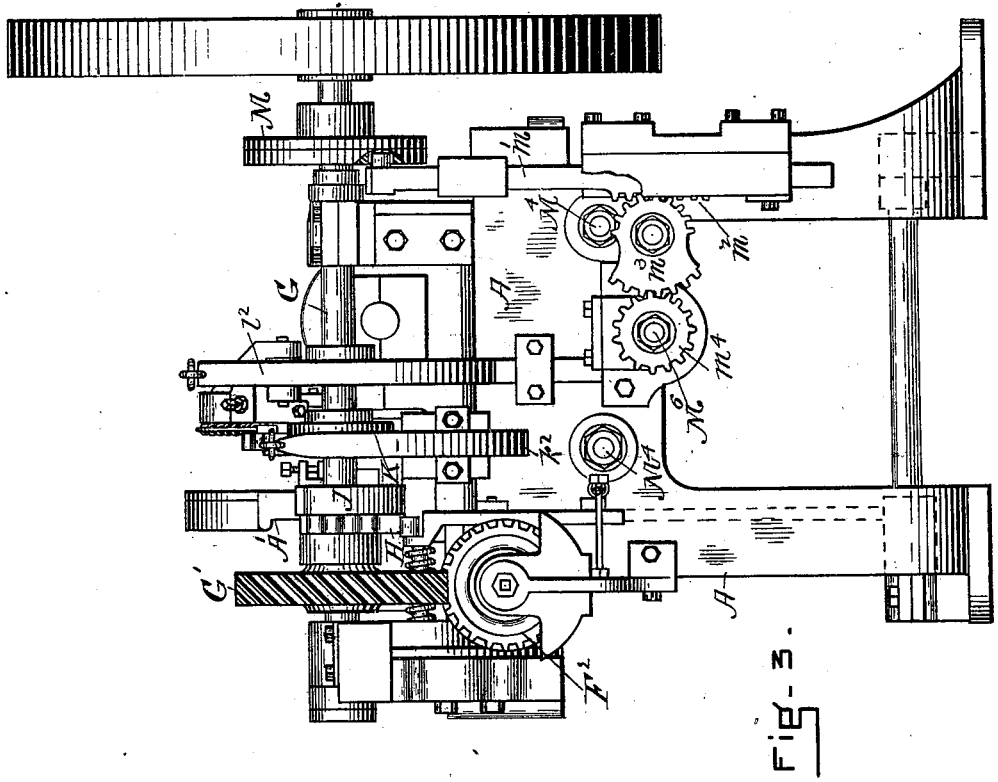

Figure 1 represents a front elevation of a machine embodying my invention. Fig. 2 is a plan. Fig. 3 is a side elevation. Fig. 4 is a section on line 4 4 of Fig. 2. Fig. 5 is an enlarged detail in plan, the portion of the superstructure being removed, showing the location of the principal operative parts. Fig. 6 is a detail of a portion of Fig. 5, showing the operative parts after the feed has taken place and blank cut. Fig. 7 is a section on line 7 7 of Fig. 6. Fig. 8 is a sectional detail showing the mechanism for driving the carriage forward and also the mechanism for operating the carriage, and Fig. 9 is a vertical section showing the grippers and the opening through which the finished toe-calk is dropped.

A is the frame. B is the main shaft, suitably supported in the frame and carrying the pulley B', by which power is given to it, an eccentric C, and a drawing mechanism $C^4$, of well-known construction, for drawing down the point of the toe-calk from the end of the blank. The shaft B also carries the pinion $B^2$, which engages with the gear E, mounted on a short shaft or stud E' and carrying on its inner end a pinion $E^2$. This pinion engages with a gear F' on shaft F. This shaft F runs across the front of the machine and has at its farther end a spiral gear $F^2$, which engages with a corresponding spiral gear G', mounted on the cam-shaft G. Upon this cam-shaft G are mounted a series of cams which give the movements to the main operative parts of the machine, the first of these cams being the wedge-cam (marked H) for giving to the carriage which carries the grippers and blank a movement up to the drawing-roll, the second, J, a cutter-carrier cam, the third, K, being the gripper-cam, by means of which the grippers which hold the blank are controlled, the fourth, L, the cam for operating what may be called the "stationary" or "anvil" hammer, and the fifth, M, the sliding-frame cam for feeding the striking-hammer progressively, so that each blow may bite a little farther into the side of the point of the toe-calk, the hammer itself being operated by the eccentric C, as described below.

A bow-shaped frame A' is carried by the bed of the machine on slides a and is held in place by set-screws a', thus being rendered adjustable. J' is the cutter-carrier, which is moved laterally, being thrown in one direction by the cam J, which acts upon the wide cam-roll J′, mounted upon the cutter-carrier and being held by the spring J⁶ against the cam. This cutter-carrier J′ is carried by a slide J⁴, which slides in a groove in the rear side of the frame A′, this groove, with the portion of the frame A′ upon which the cutter-carrier rests, furnishing a guide for the movement of the cutter-carrier. The cutter-carrier carries not only the carrier J³, but also a guideway or sluiceway J², which receives and guides the end of the bar, (marked N,) which bar is fed forward in practice until it strikes a stop or gate N′, (see Figs. 6 and 7,) this stop N′ being attached to an arm N², mounted on the carriage H′ and being always stationary so far as the blank is concerned. A second cutter J¹⁴ is mounted on the arched frame A′. The second cutter is stationary and after the cutting operation has taken place coöperates with the guideway J², crossing the end of it, and so preventing the further feeding of the rod N after the blank is cut off and before the blank is finished. The frame A′ is adjustable for different-sized toe-calks, being mounted on slides $a$ and held in place by set-screws $a'$.

Below the cutter-carrier is mounted a carriage H′, which moves at right angles to the cutter-carrier on the ways $h$, mounted on the frame A, being controlled in its movements by the cam H in the following manner: To a bracket $h'$ is pivoted a lever $h^2$, upon the upper end of which is carried a cam-roll. The lower end of this lever is connected by a connecting-rod $h^3$ with an angle-lever $h^4$, pivoted near the base of the machine, the farther end of said lever being controlled by the spring $h^5$. The upper end of this lever is connected by the connecting-rod $h^6$ with a pin $h^7$, passing through a slot $h^8$ in the frame A and into the under side of the wedge-piece $h^9$, these connections being all shown in Fig. 8. It will be noted that the projections on the cam H (see Fig. 8) will drive the wedge to the left in that figure (see also Fig. 5) and hence throw the carriage H′ forward, and having been given its full forward throw the spring $h^5$, acting on the lever system, will put the roll into the space between the smaller projections $h^{10}$ and hence will give the wedge a vibration, which will give a corresponding vibration, to the carriage, the purpose of which will be explained later. The carriage is returned by the springs $h^{11}$, which are about the tail-rods $h^{12}$ on the front of the carriage and are compressed when the carriage moves forward between the ears $h^{13}$, mounted on frame A, and nuts on the end of the tail-rods. Upon this carriage is mounted a pair of grippers K′ K², one of which, K², is generally stationary and the other, K′, being mounted in an upright in said carriage to slide at right angles to the movement of the toe-calk and having on its rear end a cam-roll $k$. It has an upright $k^5$, to which is attached by a suitable eye $a$ C-spring $k^2$. The purpose of these grippers is to grip and hold the toe-calk while it is being acted upon by the shaping-tools, these latter consisting of the drawing-roll above referred to and two hammers—the anvil and progressive hammer—both also above referred to.

The frame A has at its front end an upright H², upon the upper end of which is mounted the anvil H³, which is stationary thereon, the upper surface of this anvil H³ being on a level with the bottom of the guideway J² and in line therewith when the guideway is in its right-hand position, so that when the rod is pushed through and against the gate it will rest on top of the anvil. Thereafter the blank is held by the grippers, which are moved forward and back by the carriage to present the blank to the tools.

The stationary hammer is marked $l$. It is mounted in a rocker-arm L′ on a shaft L², suitably supported in the frame, and is operated by means of a cam-roll $l'$, lying on the surface of the cam L and held against it by means of the spring $l^2$.

The progressive hammer $m$ is mounted in a rocker-arm M′ on the shaft M², pivotally held in a sliding frame M³. This frame runs upon rods M⁴ and carries a nut M⁵, which fits about the threaded shaft M⁶. (See Fig. 4.)

The eccentric C, carried by the shaft B, is connected, by means of a suitable strap C′ and a pivoted connection C², with a ball-and-socket joint C³, into which the lower end of the rocking lever M′ fits, so that the eccentric is caused to move by the rotation of the shaft B. The lower end of the hammer-arm M′ will be vibrated, and thus cause the upper end of the said arm to vibrate and the hammer $m$ to give the necessary blows to the sides of the toe-calk; but in order that each blow of the hammer may do its part in narrowing the point of the toe-calk the shaft or fulcrum M² is moved slightly nearer to the shaft L² of the other hammer, so that without increasing the length of the blow, and consequently changing the angle at which the face of the hammer $m$ will strike the steel, the hammer will have in fact an increasing reach. For this purpose the shaft M⁶ is threaded, and the sliding frame M³, upon which the hammer-arm is mounted, is provided with the nut M⁵, the movement of this frame being controlled in the following manner, (see Figs. 3 and 4:) The cam-wheel M carries a slot upon its face, and in that slot works a cam-roll mounted upon the upper end of a slide $m'$, upon which are a series of rack-teeth $m^2$, which engage with a portion of a segment-gear $m^3$. Upon the opposite edge of said gear and at a longer radial distance thereon than the teeth which engage with the rack $m^2$ are a second set of teeth, which engage with a pinion $m^4$ on the end of said shaft M⁶. The cam in the cam-wheel M is constructed to give to the rack-rod $m'$ a reciprocating motion, which communicates an oscillating movement to the shaft M⁶ by the means described, so that the frame M³ travels a short distance in one direction, carrying with it the fulcrum of the hammer m, while the hammer m is doing its work, and thus compensating for the thinning of the metal caused by the blows of the hammer, and then a reverse movement after the hammer has finished its work to bring the hammer back into such position that it will be ready to act upon the new toe-calk blank.

To throw off the toe-calk after it has been finished, the following mechanism is employed: Upon the top of the slide which carries the movable gripper K' is mounted a latch-lever K³, the rear end of which has a roll which slides under a cam K⁴. The other gripper K² slides in block K¹⁰ on the carriage H' and has upon its upper side a hook-piece K⁶. To the upper side of the latch K³ is attached a spring connection K⁷, the other end of which is attached to the top of the slide, which carries the gripper K², this construction being such that the tendency of the spring is to pull the latch down over the hook and hold it there at all times except when its rear end is tripped by the stationary cam K⁴. When the gripper K' moves up to grip the blank, therefore, the latch engages with the hook K⁶, and when the gripper K' is again withdrawn after the toe-calk has been made the latch pulls the gripper K² back with the gripper K' until the rear end of the latch is depressed by the cam K⁴, thus releasing the gripper K². This gripper K² has a tail-rod K⁸, about which is the spring K⁹, which is compressed by the forward movement of the gripper K² between the casting K¹⁰ and a nut on the end of the tailpiece, so that as soon as the latch and hook are disengaged the gripper K² will spring back into its original position. When this gripper K² goes forward, it pushes the finished toe-calk which has been released by the rearward movement of the gripper K' (which is slightly in advance of the movement of the gripper K²) off from the anvil, so that it drops through the opening K¹¹.

In the operation of the machine, the parts being in the position shown in Figs. 2 and 5, the rod is run in through the guideway until it strikes the gate N'. The grippers then take it and the cutter-carrier then moves laterally and the cutter cuts off the rod and leaves the blank between the grippers, the guideway moving at the same time and carrying the rod laterally with the movable cutter. The blank is by this means made. The blank is then fed forward by the wedge entering behind the carriage and forcing it forward, the anvil being stationary and not mounted on the carriage. The hammers now begin their movements and strike one blow. The blank is then withdrawn slightly and the roll then proceeds to draw down the point over the edge of the anvil. Next the blank is moved forward by means of the slight projection or vibration of the wedge-cam, which throws the carriage slightly forward, and the hammers proceed to come together a second time. The wedge vibrates backward, and the carriage being withdrawn by its springs the blank is again in its first position on top of the anvil and the roll strikes it again, drawing the point downward. This cycle of operations takes place until the blank has been struck by the hammers in its advance position five times and in its rearward position by the roll five times, when the grippers release the blank and it is pulled over and falls down the opening in the table. The cutter-carrier is then drawn back and the machine is ready to receive a new blank.

It will be noted that the various movements above described are in themselves simple and may be accomplished by means which will be familiar to any mechanic. I have shown the tools combined, however, in the simplest manner of which I now have knowledge, but in such a way as to make a machine which will be compact and yet easy to construct, operate, and repair. The carriage above referred to is rendered adjustable in its throw according to the size of toe-calk to be made, and the other parts may likewise be made adjustable. I have found it best to have my tools always bear the same relation to each other and to move the blank up to the tools. This is especially so when the anvil and hammers are considered, for they are located so close together that any slight disarrangement of the hammer-operating mechanism or of the anvil, if it is movable, will result in contact between the two sufficient to dull the edges of the tools. For this reason I prefer to locate my anvil permanently on the machine-frame and make my blank reciprocate.

What I claim as my invention is—

1. In a toe-calk machine, in combination with a stationary cutter having a vertical cutting edge, a carrier movable along the side of said cutter and means whereby said carrier is moved, said carrier having mounted on it a cutter located to coöperate with said stationary cutter, and also having mounted on it the sluiceway located to direct the blank-rod between said cutters, all as set forth.

2. In a toe-calk machine, in combination with a stationary cutter, a laterally-movable carrier having thereon a second cutter located to coöperate with said stationary cutter and carrying also a sluiceway to hold the blank-rod, whereby the lateral movement of the carrier in one direction will cause the cutting operation and carry the rod beyond the cutting edge of said stationary cutter, and said stationary cutter will temporarily become a stop for the inward movement of said rod, as set forth.

3. In a toe-calk machine, a laterally-movable carrier having a sluiceway and a cutter mounted thereon, a gate closing the path of said rod before the cutting operation and a stationary cutter located to coöperate with the cutter upon said carrier to form a cutting mechanism and adapted to form a stop for the rod after the carrier has moved laterally to perform said cutting operation, all as and for the purposes set forth.

4. In a toe-calk machine a carriage having a gripping mechanism mounted thereon adapted to grip the blank, and a gate whereby the position of the front end of the blank may be determined, in combination with an anvil and means whereby said blank is moved laterally from contact and said carriage is moved and vibrated toward and from said anvil, as set forth.

5. In a toe-calk machine, a carriage and an anvil and means whereby said carriage is moved and vibrated toward and from said anvil, said carriage having gripping mechanism mounted thereon adapted to grip the blank, and carrying a gate whereby the position of the front end of said blank may be determined, in combination with a cutter-carrier mounted above said carriage and adapted to move at right angles thereto, and a cutting mechanism, one element of which is stationary, the other element being mounted upon said cutter-carrier, as and for the purposes set forth.

6. In a toe-calk machine, in combination with a stationary anvil, a blank-feeding carriage adapted to slide on the frame of a machine and means whereby it is given a forward-and-back movement and a vibrating movement while in its forward position, said means consisting of a wedge-piece located against the rear of said carriage, and a cam suitably connected thereto, said carriage being provided with gripping mechanism, substantially as described.

7. In a toe-calk machine, a laterally-movable carrier, a cutting mechanism, one element of which is mounted on said carrier, a sluiceway also mounted upon said carrier, a gate stationary in relation thereto and closing the end of said sluiceway, a cutting mechanism, one element of which is mounted upon said carrier, the other element being stationary and adapted to close the end of said sluiceway during the operation of the toe-calk-forming mechanism, in combination with means whereby said toe-calk is formed, all as and for the purposes set forth.

8. In a toe-calk machine, a laterally-movable carrier, having a sluiceway mounted thereon, a cutting mechanism, one element of which is mounted thereon, a carriage movable at right angles to said carrier, a gate and a gripping mechanism mounted thereon, and a toe-calk-forming mechanism located in front of said carriage and adapted to act upon the blank held by said carriage when said carriage is in its forward position, all as and for the purposes set forth.

9. In a toe-calk machine, in combination with a cutting mechanism and mechanism whereby the toe-calk is formed, a carriage having a pair of grippers mounted thereon, one of said grippers having a movement toward the other whereby it will grip the blank, and a reverse movement to release the blank, the second gripper being adapted to act as a follower after said toe-calk-forming mechanism has acted on the blank and the first gripper has released the blank, to push the finished toe-calk toward the first gripper and off the anvil, and means whereby said grippers are operated and said blank is finished, all substantially as and for the purposes set forth.

10. In a toe-calk machine, means for shaping the sides of the spur of said toe-calk, consisting of two oscillating hammers, and means whereby they are oscillated, the axis of oscillation of one of said hammers being adapted to be moved toward and from the axis of oscillation of the other hammer, and means whereby it is so moved, as set forth.

11. In a toe-calk machine, two oscillating hammers and means whereby they are oscillated, the axis of oscillation of one hammer being mounted on a sliding frame, in combination with means whereby a sliding movement is given to said frame, all as set forth.

12. In a toe-calk machine, a pair of oscillating hammers and means whereby they are oscillated, said means consisting of a sliding frame carrying the axis of oscillation of one of said hammers, and provided with a threaded portion moving on a second shaft, and means whereby said shaft is oscillated, as set forth.

J. H. WILSON.

Witnesses:
GEORGE O. G. COALE,
LEO. G. WALSH.